March 26, 1968     R. E. PECHACEK     3,374,935
APPARATUS FOR USE IN MANUFACTURING LAMINATED HEADS OR CLOSURES
Filed March 28, 1966     2 Sheets-Sheet 1

Raymond E. Pechacek
INVENTOR.

BY Hayden & Pravel

ATTORNEYS

March 26, 1968   R. E. PECHACEK   3,374,935
APPARATUS FOR USE IN MANUFACTURING LAMINATED HEADS OR CLOSURES
Filed March 28, 1966   2 Sheets-Sheet 2

Raymond E. Pechacek
INVENTOR.

BY Hayden & Pravel
ATTORNEYS

United States Patent Office 3,374,935
Patented Mar. 26, 1968

3,374,935
APPARATUS FOR USE IN MANUFACTURING LAMINATED HEADS OR CLOSURES
Raymond E. Pechacek, Houston, Tex., assignor to Hahn & Clay, a corporation of Texas
Filed Mar. 28, 1966, Ser. No. 537,805
7 Claims. (Cl. 228—44)

This invention relates to new and useful improvements in apparatus for use in manufacturing laminated pressure vessel heads or the like.

An object of this invention is to provide a new and improved apparatus for use in manufacturing laminated pressure vessel heads or the like wherein means is provided for applying sufficient force to each of a plurality of sectors or gores disposed laterally and longitudinally with respect to each other on a hemisphere or other partial sphere to bring them into close contact with the curved surface of the layer therebelow during welding.

The preferred embodiment of this invention will be described hereinafter, together with other features thereof, and additional objects will become evident from such description.

The invention will be more readily understood from a reading of the following specification and by reference to the accompanying drawings forming a part thereof, wherein an example of the invention is shown, and wherein.

Figure 1:
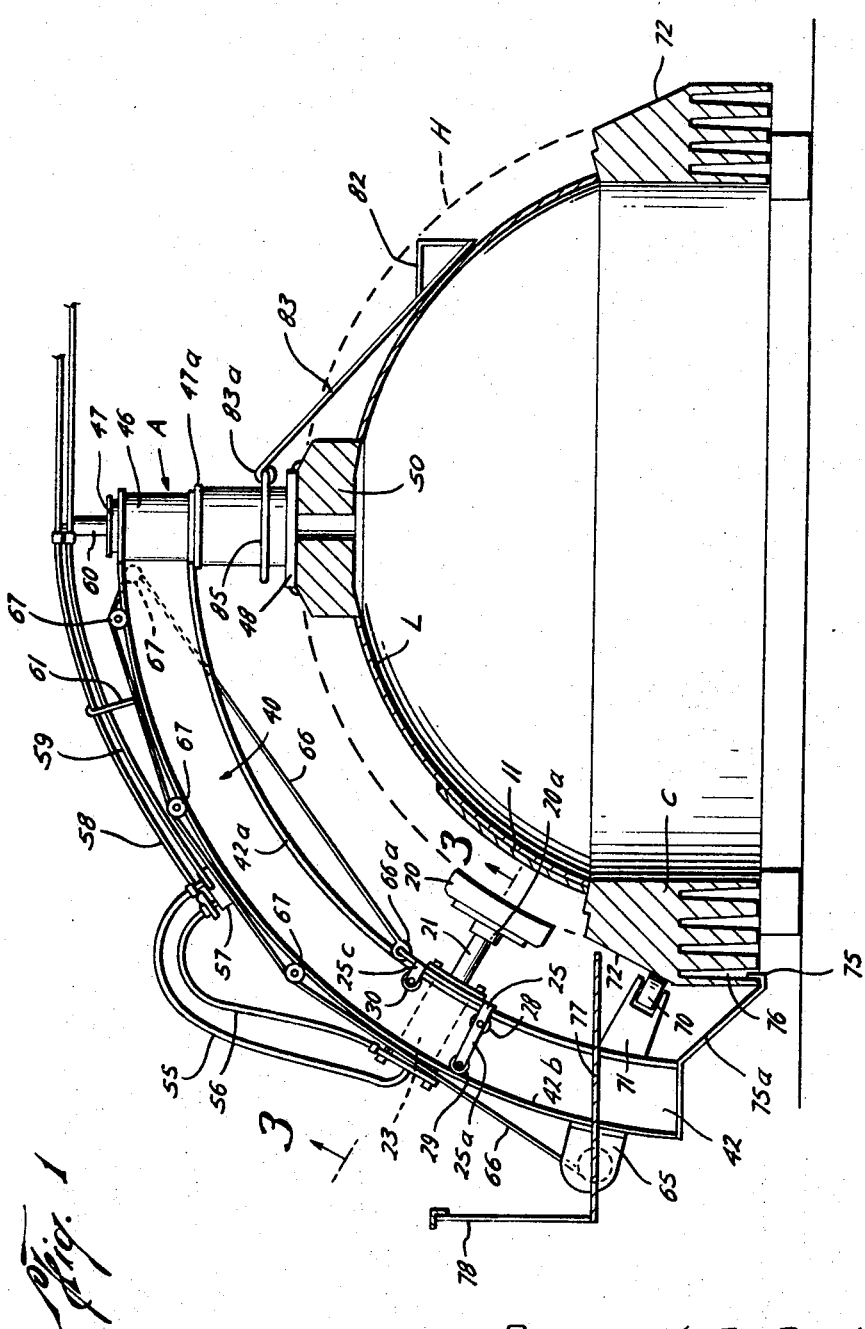
FIG. 1 is a view, partly in elevation and partly in section, illustrating the apparatus of the present invention in position for use in the manufacture of a laminated pressure vessel head.
Figure 2:
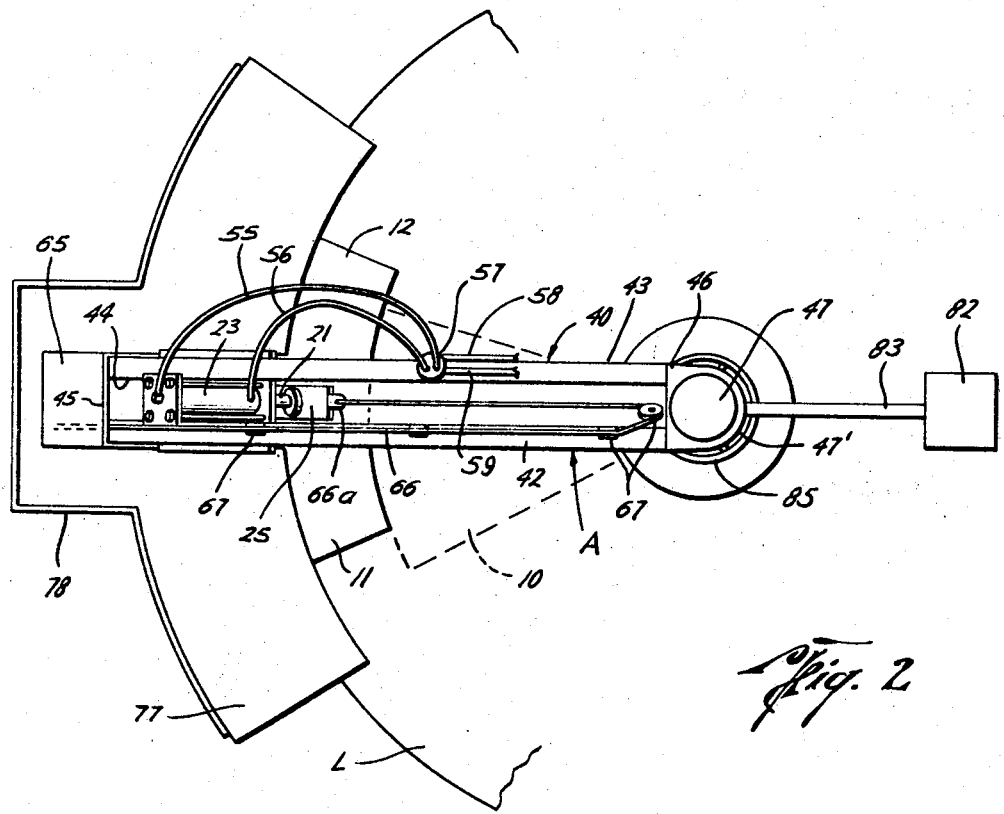
FIG. 2 is a partial plan view of the apparatus illustrated in FIG. 1.

In the drawings, the letter A designates generally the apparatus of this invention which is used for manufacturing laminated heads or closures or similar products. The apparatus A is illustrated in the drawings as mounted on an inner layer L which forms the first layer or support for additional outer layers which ultimately make up the head, the thickness of which is indicated at H by the dotted line. The inner layer L is initially welded or formed with a connector ring C which may be considered a part of the inner layer L for purposes of description. Each of the outer layers which are welded to the inner layer 12 is preferably made of a plurality of sectors or gores, one of which is shown at 10 in dotted lines (FIG. 2) and two of which are shown at 11 and 12 in solid lines (FIGS. 1 and 2). It will be understood that in the final formation of each of the outer layers, the sections 10, 11, and 12 are entirely covering the inner layer L, and each subsequent layer is similarly welded and formed until a predetermined number of outer layers are provided to obtain the desired thickness indicated at H.

The apparatus A includes a pressure ram 20 which is adapted to be moved inwardly and outwardly with respect to the inner layer L to apply a force to each of the sections 10, 11, and 12 as each is being welded to the inner layer L, and to also apply such force to subsequent sections in forming the other outer layers. It is to be observed that the inner layer L is in the form of a partial sphere, and preferably a hemisphere. Also, each of the sections 10, 11, and 12 is curved to closely conform to the external surface of the inner layer L. The pressure ram 20 is preferably mounted on a piston rod 21 by a swivel 20a so that the ram 20 may be rotated as desired to different positions relative to each of the sections being applied to the layer therebelow; although the ram 20 may be rigidly connected to the rod 21, if desired.

The piston rod 21 is connected to a conventional piston 22 which is disposed in a conventional fluid cylinder 23.

The piston 22 together with the cylinder 23 are secured to a carriage or movable frame 25 by means of tie bolts 26 or other suitable securing means. The carriage 25 is preferably formed with a pair of upwardly-extending, lower wheel support arms 25a and 25b upon which are mounted lower guide rollers 28 and upper guide rollers 29. Also, at the forward or upper end of the carriage 25, forward roller support arms 25c are provided on each side of the carriage for additional rollers 30, one of which is shown in FIG. 1.

A support arm 40 is provided for supporting the hydraulic cylinder 23 together with the pressure ram 20 connected therewith during longitudinal movement of the cylinder 23 and the ram 20. Such support arm 40 is preferably made of two I-beams 42 and 43 (FIG. 3) which are welded together with interconnecting plates of elements and which are provided with a slot or opening 44 therebetween for the passage of the hydraulic cylinder 23 during relative movement of the cylinder 23 with respect to the arm 40. A portion of the connecting plate 45 which connects the I-beams 42 and 43 together is seen at the left-hand portion of FIG. 2. The upper ends of the I-beams 42 and 43 are connected together by a swivel or pivot sleeve 46 which fits around a pivot pin 47. The pivot pin 47 is enlarged at 47a to provide a flange upon which the pivot sleeve 46 may rest during rotation relative to the pin 47. The enlargement 47a extends down to an enlarged flange 48 which is preferably welded to a part of the inner layer L such as a closure element 50. Thus, the pivot pin 47 is rigidly secured at the center point of the inner layer L to provide a central point for the rotational or pivotal movement of the rotatable support arm 40 with respect to the inner layer L.

The I-beam 42 is provided with outwardly-extending flanges which provide track surfaces 42a and 42b for receiving the rollers 28 and 29, respectively. Also, the upward or forward roller 30 rides upon the track surface 42a. On the oposite side of the support arm 40, the I-beam 43 has track surfaces 43a and 43b which receive wheels 28 and 30 on the surface 43 and the wheel or roller 29 on the surface 43b.

For operating the fluid actuated system to move the pressure ram 20 inwardly and outwardly with respect to the sections being applied, the flow of pressure fluid to the cylinder 23 is through flexible hoses or lines 55 and 56 which are connected to a valve 57.

Figure 3:
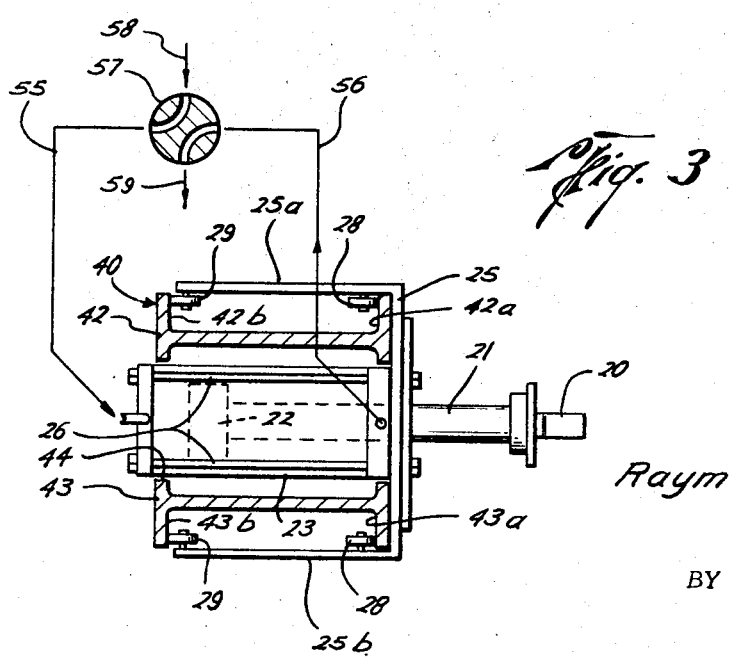
FIG. 3 is an enlarged view of a portion of the apparatus of FIG. 1, taken on line 3—3 of FIG. 1.

The valve 57 is mounted on the support arm 40 and is displaced to one side as seen in FIG. 2 so as to avoid interference with the movement of the cylinder 23 relative to the support arm 40. Fluid under pressure is emitted from a suitable source not shown through a rigid tube 58 which is connected to the valve 57 and is discharged from the valve 57 through a rigid tube 59. In FIG. 3, the valve 57 is schematically illustrated to show that the inlet line 58 from the source of fluid pressure may be through the valve 57 to the flexible line 55 and thus to the cylinder 23 for moving the piston 22 and the ram 20 towards the section 11 to be brought into close contact with the external surface of the inner layer L. The exhaust fluid from the cylinder 23 is through the line 53 and the valve 57 to the rigid exhaust line 59 as illustrated in FIG. 3. Upon a reversal of the valve 57, the fluid pressure from the inlet line 58 flows through the line 56 to withdraw the ram 20 to a position such as shown in FIG. 1 while the pressure fluid above the piston 22 is discharged through the line 55 to the line 59. The rigid lines 58 and 59 are supported by a fixed bracket 60 and other intermediate brackets 61 with suitable swivels (not shown) in the lines 58 and 59 beyond the support 60 for permitting movement of the lines 58 and 59 together with the support arm 40.

The entire ram assembly including the ram 20 and the hydraulic cylinder 23 is moved along a curved path provided by the curved tracks 42a and 43a on the support arm 40 by means of a powered winch 65 mounted on the lower end of the support arm 40 and to which is connected a cable 66. The cable 66 is directed over a number of guide rollers or pulleys 67 suitably mounted on the support arm 40. The free end 66a of the cable 66 is suitably connected to the carriage 25 for the cylinder 23 so that when the winch 65 is actuated to wind up the cable 66, the carriage 25 and all the parts therewith are moved upwardly on the support arm 40 with the guide wheels 28 and 30 following the track surfaces 42a and 43a. When the winch 65 is unwound, so that the cable 66 may pay out, the weight of the ram 20, cylinder 23, and the other parts on the carriage 25 is sufficient to return the ram 20 in a downward direction along the support arm 40 until the unwinding of the cable 66 is stopped at the winch 65. The winch 65 is preferably power operated but it may be hand operated in some cases.

The lower end of the support arm 40 has a guide means therewith which includes a guide roller or wheel 70 that is mounted on a bracket 71 extending from the lower surface of the support arm 40. Such wheel 70 is positioned at an angle to roll on the external surface 72 of the connector C, although the position of such roller or wheel 70 may be otherwise adjusted, depending upon the shape of the particular surface 72. Such roller 72 provides substantially frictionless movement at the lower end of the support arm 40 relative to the inner layer L and the connector C. The guide roller 70 together with the bracket 71 space the lower end of the support arm 40 outwardly so that the curvature of the support arm 40 follows generally the curvature of the inner layer L and is positioned a sufficient distance from the layers to be applied with the ram 20 to permit reciprocal movement of the ram 20 during operation.

The guide means at the lower end of the support arm 40 also includes a hook 75 which may fit into a finger shaped opening 76 in the connector C if such is available as indicated in FIG. 1, or such hooks 75 may be of the proper length to fit into contact with the actual inner surface of the layer L if the connector C does not have such an opening 76. The hook 75 is a part of a hook lever 75a which is welded or otherwise secured to the lower end of the support arm 40. Such hook 75 prevents the support arm 40 from being forced outwardly at its lower end when the ram 20 is forced into contact with the section 11 or other section being applied to the layer therebelow, whereby a sufficient force can be imparted from the ram 20 to the section being welded to obtain a close contact between the inner surface of such section 11 and the layer L there-below prior to the tack welding of same.

For ease of use, a platform 77 having a guard rail 78 may be welded or otherwise suitably affixed to the support arm 40 so that welders or other personnel using the apparatus A may stand on the platform during rotational movement of the apparatus A to other positions with respect to the layer L. Also, a movable seat 82 which is carried by a hanger arm 83 having a removable hook 83a thereon is mounted for movement to different positions adjacent the particular sections 10, 11, or 12 being welded to the inner layer L or other outer layer subsequently applied. Such seat 82 is supported by the hook 83a extending over a support ring 85 which is connected to the enlarged portion 47a by welding or other suitable connecting means. If desired, two of such seats 82 may be provided so that there can be two welders seated on each side of a particular section being welded.

In the use or operation of the apparatus A of this invention, the support arm 40 is mounted on the pivot pin 47 for rotational or pivotal movement with respect thereto, with the guide roller 70 serving to properly space the lower end of the support arm 40 with respect to the inner layer L. The hook 75 is positioned in the slot 76 or other suitable inner surface to prevent an outward movement of the support arm 40 when the ram 20 engages the section to be welded to the inner layer L. The ram 20 is moved when it is in the outward or raised position such as indicated in FIG. 1 and is brought into the proper position for clamping or forcing the section therebelow into contact with the layer beneath the layer being welded.

The ram 20 may be rigidly fixed to the piston rod 21, or it may be rotatably mounted by the swivel 20a, but in either event, the ram 20 may be moved to different positions with respect to the particular section such as 11 which is being brought into close contact with the layer L during the welding thereof. As explained, the ram 20 may be moved both longitudinally by the means of the winch 65 and laterally by moving the entire support arm 40. In that way, the ram 20 may be positioned at any location for obtaining the proper force to bring the section 11 or such other section which is being welded down into close contact with the layer therebelow.

The foregoing disclosure and description of the invention are illustrative and explanatory thereof and various changes in the size, shape, and materials, as well as in the details of the illustrated construction, may be made within the scope of the appended claims without departing from the spirit of the invention.

What is claimed is:

1. An apparatus for use in manufacturing laminated heads or closures, comprising:
    (a) a pressure ram adapted to force an outer curved layer into close contact with an inner layer which is shaped as a partial sphere,
    (b) a rotatable support arm having a curvature generally conforming to the external surface of the inner layer,
    (c) a pivot pin adapted to be positioned at approximate the central point of the inner layer for pivotally mounting one end of the rotatable support arm thereto,
    (d) guide means on the other end of the rotatable support arm maintaining the rotatable support arm spaced from the inner layer a predetermined distance during rotational movement thereof, and
    (e) means mounting said pressure ram on said rotatable support arm for lateral movement rotationally with the support arm and for longitudinal movement in a curved path conforming to the curvature of the support arms.

2. The structure set forth in claim 1, including:
    (a) a fluid-actuated piston disposed in a cylinder and connected to the pressure ram for providing fluid pressure to operate the pressure ram,
    (b) said piston and cylinder being movable on the support arm with the pressure ram, and
    (c) means for controlling the supply of pressure fluid to the cylinder for operating the pressure ram.

3. The structure set forth in claim 1, wherein the means mounting said pressure ram for longitudinal movement in a curved path on the support arm includes:
    (a) a curved track on said support arm, and
    (b) rollers connected to said pressure ram and movable along said curved track.

4. The structure set forth in claim 1, wherein the means mounting said pressure ram for longitudinal movement in a curved path on the support arm includes:
    (a) a curved track on said support arm,
    (b) rollers connected to said pressure ram and movable along said curved track,
    (c) winch means mounted on said support arm, and
    (d) a cable operably connected from said winch means to said pressure ram for longitudinally moving the rollers along the curved track to thereby longitudinally move the pressure ram in the curved path.

5. The structure set forth in claim 1, wherein said guide means includes:
    (a) a hook adapted to engage an inner surface of the inner layer to prevent the support arm from being forced outwardly when the pressure ram is acting to force the outer layer into contact with the inner layer.

6. The structure set forth in claim 1, wherein said guide means includes:
 (a) a hook adapted to engage an inner surface of the inner layer to prevent the support arm from being forced outwardly when the pressure ram is acting to force the outer layer into contact with the inner layer, and
 (b) a riding wheel adapted to engage an external surface secured to said inner layer to facilitate rotational movement of the support arm.

7. The structure set forth in claim 1, including:
 (a) movable seat for a welder adapted to be positioned adjacent each section of the outer layer being welded to its inner layer,
 (b) a hanger arm extending from said movable seat, and
 (c) means for suspending said hanger arm for rotational movement to position said seat at different rotational positions externally of said inner layer.

No references cited.

RICHARD H. EANES, JR., *Primary Examiner.*